US011658983B2

(12) United States Patent
Leibmann et al.

(10) Patent No.: US 11,658,983 B2
(45) Date of Patent: May 23, 2023

(54) AUTHENTICATION AND AUTHORIZATION ACROSS MICROSERVICES

(71) Applicant: Microsoft Technology Licensing, LLC, Redmond, WA (US)

(72) Inventors: Matthias Leibmann, Redmond, WA (US); Grigory V. Kaplin, Redmond, WA (US); Vikas Ahuja, Sammamish, WA (US); Kapil Kumar Jain, Issaquah, WA (US); Qinxiao Zhou, Bellevue, WA (US); Ran Cheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 16/784,802

(22) Filed: Feb. 7, 2020

(65) Prior Publication Data
US 2021/0250361 A1    Aug. 12, 2021

(51) Int. Cl.
*H04L 29/06* (2006.01)
*H04L 9/40* (2022.01)

(52) U.S. Cl.
CPC .......... *H04L 63/105* (2013.01); *H04L 63/083* (2013.01)

(58) Field of Classification Search
CPC ...... H04L 63/105; H04L 63/083; G06F 21/33
USPC .......................................................... 726/4
See application file for complete search history.

(56) References Cited

U.S. PATENT DOCUMENTS

| 8,327,419 | B1 * | 12/2012 | Korablev | H04L 63/105 726/19 |
|---|---|---|---|---|
| 8,566,932 | B1 * | 10/2013 | Hotta | G06F 21/567 726/22 |
| 8,806,582 | B2 * | 8/2014 | Dietrich | H04L 63/0853 726/4 |
| 10,347,293 | B1 * | 7/2019 | Skinner | G06F 40/284 |
| 10,798,090 | B2 * | 10/2020 | Ogawa | H04L 67/1095 |
| 10,958,641 | B2 * | 3/2021 | Burmester | H04L 63/105 |
| 10,958,644 | B2 * | 3/2021 | Burmester | H04L 63/0861 |
| 2011/0191592 | A1 * | 8/2011 | Goertzen | G06F 21/31 713/182 |

(Continued)

FOREIGN PATENT DOCUMENTS

| EP | 0547741 A1 | 6/1993 |
|---|---|---|
| EP | 1084464 A1 | 3/2001 |

OTHER PUBLICATIONS

Dynamic Identity Delegation Using Access Tokens in Federated Environments, Gomi, Jul. 2011 (Year: 2011).*

(Continued)

*Primary Examiner* — Jahangir Kabir
(74) *Attorney, Agent, or Firm* — Christopher J. Volkmann; Kelly, Holt & Christenson, PLLC

(57) ABSTRACT

An authorization policy defines permissions that are exposed by a microservice. When a call is made to the microservice, it includes an access token. An application identifier uniquely identifying the calling application is extracted from the token. An access pattern, used by the calling application to obtain the access token and make the call to the microservice, is identified. Permissions that may be granted to the calling application are identified in the authorization policy based upon the application identifier and the access pattern that is identified. An authorization decision is made as to whether to authorize the call, based upon the granted permissions.

20 Claims, 6 Drawing Sheets

(56) References Cited

U.S. PATENT DOCUMENTS

| | | | |
|---|---|---|---|
| 2017/0099299 A1* | 4/2017 | Sutton | H04L 63/105 |
| 2018/0300471 A1* | 10/2018 | Jain | H04W 12/61 |
| 2019/0149592 A1 | 5/2019 | Lander et al. | |
| 2019/0180002 A1 | 6/2019 | Gaur et al. | |
| 2019/0273746 A1 | 9/2019 | Coffing | |
| 2020/0117817 A1* | 4/2020 | Chen | H04L 63/105 |
| 2020/0396223 A1* | 12/2020 | Dube | H04L 63/0807 |

OTHER PUBLICATIONS

"International Search Report and Written Opinion Issued in PCT Application No. PCT/US2020/064981", dated May 18, 2021, 17 Pages.

Aggarwal, Bhavya, "Authentication and Authorization in Microservices", Retrieved From: https://dzone.com/articles/authentication-and-authorization-in-microservices, Mar. 19, 2019, 4 Pages.

Ayoub, Mina, "Microservices Authentication and Authorization Solutions", Retrieved From: https://medium.com/tech-tajawal/microservice-authentication-and-authorization-solutions-e0e5e74b248a, Apr. 24, 2018, 13 Pages.

Coelho, Nuno Mateus., "Security in Microservices Architectures", Retrieved From: https://www.researchgate.net/publication/329952695_Security_in_Microservices_Architectures, Dec. 2018, 9 Pages.

Pahl, et al., "Securing IoT Microservices with Certificates", In Proceedings of The IEEE/IFIP Network Operations and Management Symposium, Apr. 23, 2018, 5 Pages.

Walsh, et al., "Mechanisms for Mutual Attested Microservice Communication", In Companion Proceedings of the 10th International Conference on Utility and Cloud Computing, Dec. 5, 2017, 6 Pages.

Yarygina, Tetiana, "Exploring Microservice Security", In Dissertation Submitted for the Degree of Philosophiae Doctor (PhD) to Department of Informatics, University of Bergen, Jul. 4, 2018, 144 Pages.

* cited by examiner

US 11,658,983 B2

AUTHENTICATION AND AUTHORIZATION ACROSS MICROSERVICES

BACKGROUND

Computing systems are in wide use. Some computing systems host services that may be accessed by one or more different organizations or tenants. Some services are written as relatively large applications that handle multiple different aspects of the service. For instance, a service may be written as a single application that handles an organization's electronic mail, to-do lists, and calendar functions.

Recently, however, such services are often broken into microservices. Microservices are loosely coupled to other microservices within the context of an overall service or computing system. Thus, for example, one microservice may perform electronic mail functions while a separate microservice performs functions related to a to-do list, while yet another microservice performs scheduling tasks in a calendar system.

It is not uncommon for a microservice to expose an application program interface (API). The API can be called other microservices (or other requesting entities) in order to have various tasks performed.

The discussion above is merely provided for general background information and is not intended to be used as an aid in determining the scope of the claimed subject matter.

SUMMARY

An authorization policy defines permissions that are exposed by a microservice. When a call is made to the microservice, it includes an access token. An application identifier uniquely identifying the calling application is extracted from the access token. An access pattern, used by the calling application to obtain the access token and make the call to the microservice, is identified. Permissions that may be granted to the calling application are identified in the authorization policy, based upon the application identifier and based on the access pattern that is identified. An authorization decision is made as to whether to authorize the call, based upon the granted permissions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
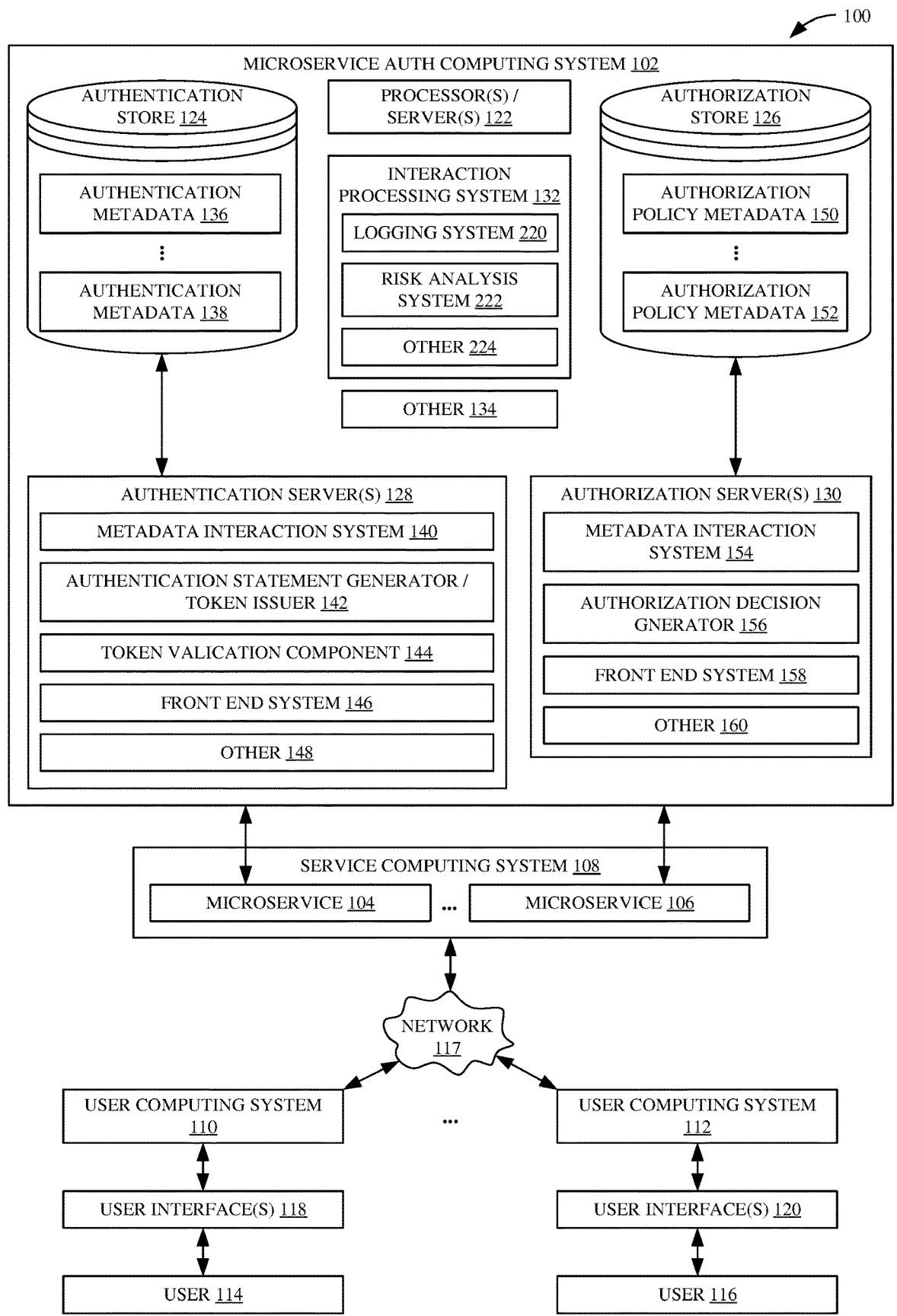
FIG. 1 is a block diagram of one example of a computing system architecture.

When a service is implemented using a plurality of different microservices, it is quite common that the microservices need to talk to one another in order to deliver acceptable performance for the overall service. However, all microservices need not have full access to data controlled by all other microservices.

Considering the example mentioned above, assume that a service includes a to-do list (or task management) microservice, a calendar microservice, an electronic mail microservice, etc. It may be that a user on a mobile device application wishes to access his or her to-do list and perform a management operation (such as to add or delete a list item). In that case, the user may interact with the mobile device application which interacts with the to-do microservice. However, the task list data may be owned by the calendar microservice. Therefore, the user may request the to-do microservice to perform an operation on the task list data. In that case, the to-do microservice must make an interactive request to the calendar microservice which owns the task list data.

In such a scenario, the to-do microservice need not have full access to all of the calendar data. For instance, there is no need for the to-do microservice to have access to meetings that are scheduled on the user's calendar. Thus, the permissions granted by the calendar microservice should limit the permissions granted to the to-do microservice to access only the task list data on the calendar microservice. Further, the to-do microservice should authenticate itself to the calendar microservice before any permissions are granted it.

This type of authorization and authentication management can be very difficult to control among microservices. Further, when new microservices are added, or when existing microservices are modified, it can be difficult to control changes to the authentication and authorization processes corresponding to those microservices.

Thus, the present description proceeds with respect to a central microservice authorization and authentication computing system (collectively referred to as a microservice AUTH computing system). Each microservice has authentication metadata and authorization policy metadata. The authentication metadata identifies the microservice and can be used to request an access token to access a different microservice. The authorization policy metadata defines the types of permissions that the microservice exposes to other microservices or other requesting entities (such as mobile device applications, web applications, etc.), and it defines permissions that are granted to different microservices (or requesting entities) using different access patterns. While the authentication and authorization metadata corresponds to a particular microservice, it is managed at a central microservice AUTH computing system. In this way, changes can more easily be made to the authentication and authorization metadata during runtime, and they can also be made to accommodate for new microservices or modified microservices.

FIG. 1 is a block diagram showing one example of a computing system architecture 100 in which microservice AUTH computing system 102 is shown being accessed by a plurality of different microservices 104-106 that implement a service provided by service computing system 108. FIG. 1 also shows that a plurality of different user computing systems 110-112 can be used by users 114-116 in order to access one or more microservices 104-106 through a network 117. User computing systems 110-112 can be implemented on a variety of different types of user devices, such as mobile devices, laptop computers, desktop computers, etc.

Network 117 can be a wide variety of different types of networks. It can include, for example, a wide area network, a local area network, a cellular network, a near field communication network, or any of a wide variety of other networks or combinations of networks.

In FIG. 1, user computing system 110 is shown generating user interfaces 118 for interaction by user 114. User 114 illustratively interacts with user interfaces 118 in order to control and manipulate user computing system 110, and some parts of the microservices 104-106 in service computing system 108.

User computing system 112 is shown generating user interfaces 120 for interaction by user 116. User 116 interacts with user interfaces 120 in order to control and manipulate user computing system 112 and some parts of microservices 104-106 in service computing system 108.

Microservice AUTH computing system 102 illustratively includes one or more processors or servers 122, authentication store 124, authorization store 126, one or more authentication servers 128, one or more authorization servers 130, interaction processing system 132, and it can include a wide variety of other items 134. Authentication store 124 can include a set of authentication metadata 136-138 corresponding to each microservice 104-106.

Authentication server 128 can be accessed by microservices 104-106 in order to obtain authentication statements (e.g., tokens) that can be used to access other microservices. Thus, authentication server 128 can include metadata interaction system 140, authentication statement generator/token issuer 142, token validation component 144, frontend system 146, and it can include other items 148.

Frontend system 146 can expose an interface for access by microservices 104-106, or it can be otherwise accessed by the microservices 104-106, and by authentication servers 130. For example, when microservice 104 wishes to access microservice 106, it can call the API exposed by front end system 146 in authentication server 128 to obtain an access token. Metadata interaction system 140 interacts with authentication store 124 in order to obtain the authentication metadata corresponding to microservice 104 (and/or microservice 106). Authentication statement generator/token issuer 142 can issue a token to microservice 104 that microservice 104 can use to access microservice 106.

Authorization store 126 can include a plurality of sets of authorization policy metadata (e.g., a plurality of authorization policies) 150-152. In one example, a separate authorization policy 150-152 is stored for each microservice 104-106. Each authorization policy defines which microservices can have access to the microservice (e.g., requesting microservices) corresponding to the authorization policy (e.g., the receiving microservice). It defines the particular permissions that are granted to the requesting microservice as well. It does this, in one example, by using the (application identifier (App ID) of the requesting microservice and the access pattern it is using to request that access. This is described in greater detail below.

Authorization server 130 includes metadata interaction system 154, authorization decision maker 156, frontend system 158, and it can include other items 160. Assume for the sake of example that microservice 104 is requesting access to microservice 106 (e.g., microservice 104 is the requesting microservice and microservice 106 is the receiving microservice). In requesting access, microservice 104 calls microservice 106 and provides an access token. Requested permissions can be provided along with the access token, with the request, or assigned at the time of access. Microservice 106 can provide this information to authorization server 130 through frontend system 158. Authorization server 130 itself, or using authentication server 128, can validate the token and obtain the App ID. Authorization decision generator 156 can then identify the access pattern that was used by the requesting microservice 104, and use that, in conjunction with the App ID, to obtain the applicable authorization policy 150, using metadata interaction system 154. Once the applicable authorization policy (or policies) are identified, authorization decision generator 156 can identify, within that policy (or those policies), permissions that are to be granted to the requesting microservice 104. It can then determine whether the access being requested by microservice 104 is included in those permissions. If so, it can issue a decision granting the requested access. If, on the other hand, the requested access is not within the permissions granted according to the authorization policy, then authorization decision generator 156 can issue a decision denying the access request, as an unauthorized request.

Figure 2:
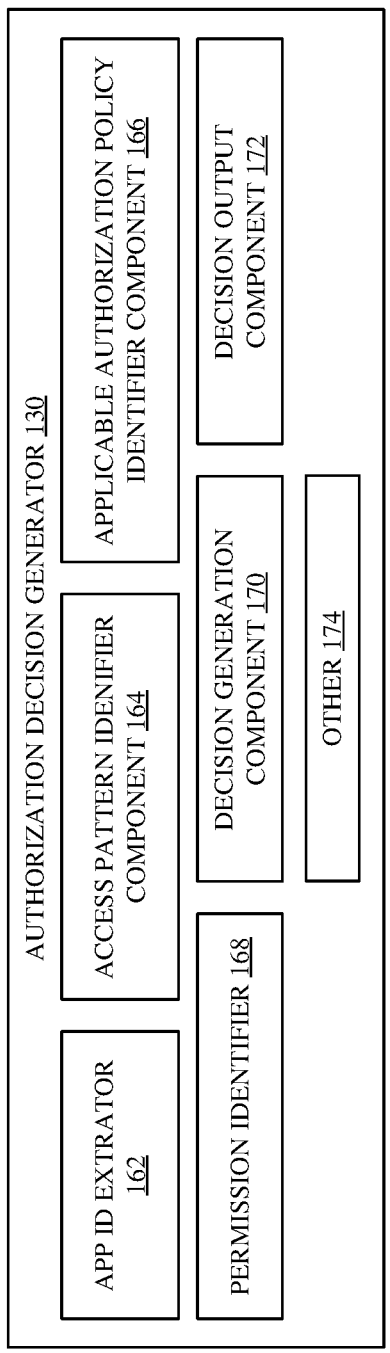
FIG. 2 is a block diagram showing one example of an authorization decision generator, in more detail.

FIG. 2 shows a block diagram of one example of authorization decision generator 130, in more detail. FIG. 2 shows that authorization decision generator 130 can include App ID extractor 162, access pattern identifier component 164, applicable authorization policy identifier component 166, permission identifier 168, decision generation component 170, decision output component 172, and it can include other items 174. App ID extractor 162 extracts the App ID from the access token, and access pattern identifier component 164 identifies the access pattern that was used by the requesting microservice 104. Some examples of access patterns are based on user interactive requests (e.g., "get my To-Do list items"), while others may be some form of background processing (e.g., "send reminders on due tasks in the To-Do list"). These can be treated differently. For instance, the background processes may not need to have the same level of access as the user interactive processes.

Using this information, applicable authorization policy identifier component 166 can identify all applicable authorization policies 150-152, and permission identifier 168 can identify the permissions that are granted through those policies, given the identified access pattern. Decision generation component 170 then analyzes the granted permissions to determine whether they include the permissions requested by the requesting microservice 104. If so, decision output component 172 outputs a decision granting the requested access. If not, decision output component 172 outputs a decision denying the requested access.

Figure 3A:
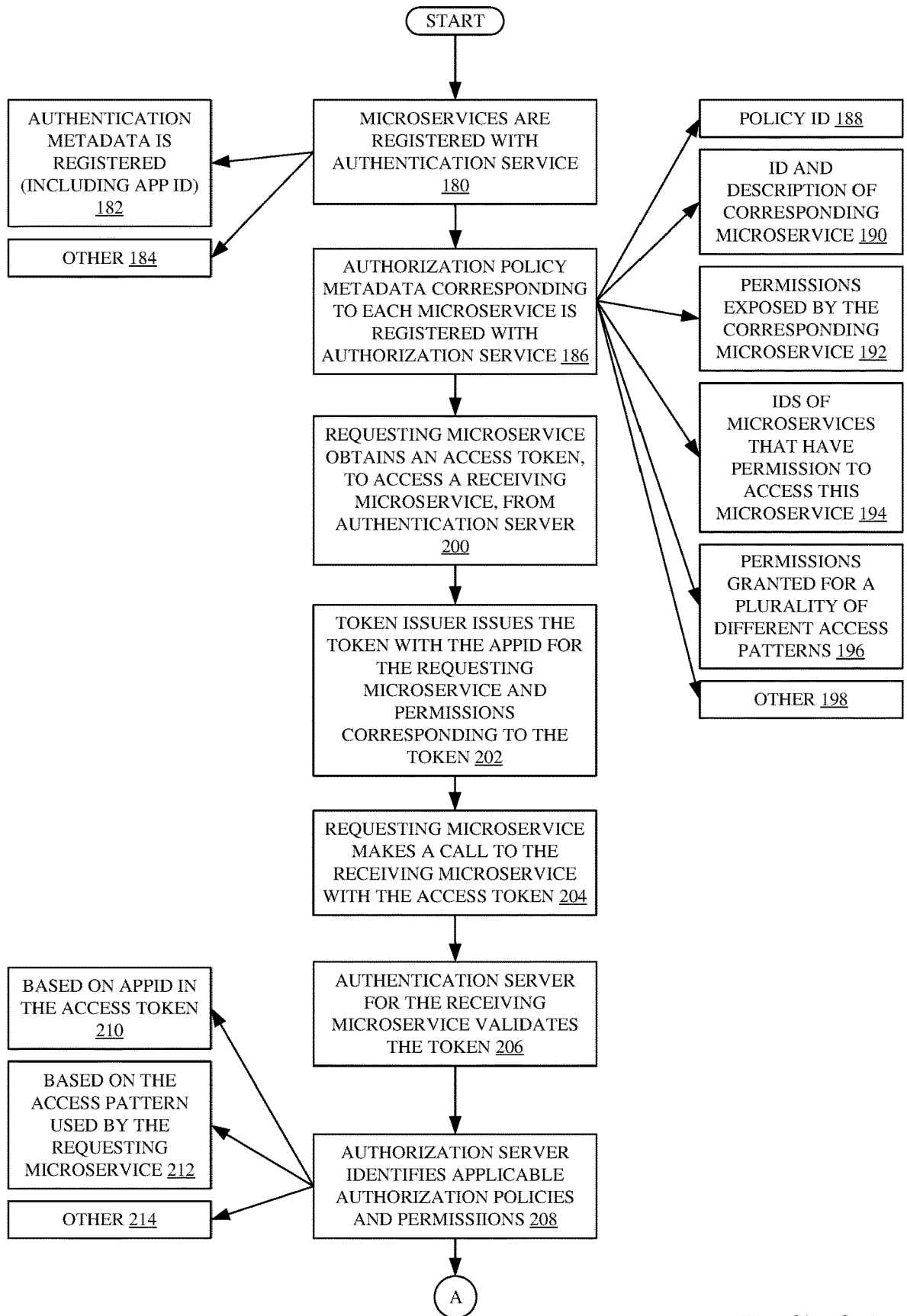
FIGS. 3A and 3B show a flow diagram illustrating one example of the operation of the computing system architecture shown in FIG. 1, in performing authentication and authorization operations for requests between microservices.
Figure 3B:
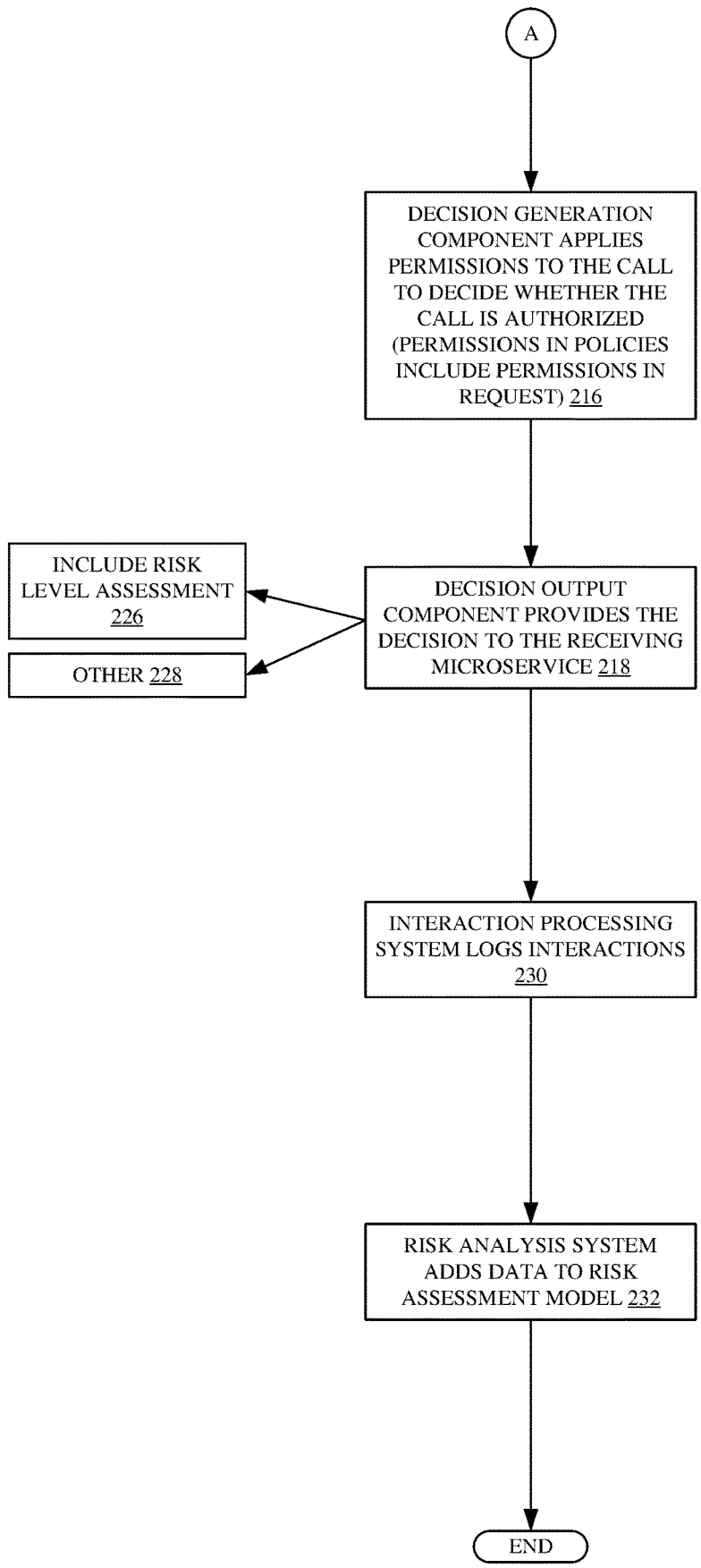

FIGS. 3A and 3B show a flow diagram illustrating one example of the operation of architecture 100 in governing authentication and access for an access request being made on a receiving microservice (e.g., microservice 106).

It is first assumed that the microservices 104-106 are registered with microservice AUTH computing system 102. This is indicated by block 180 in the flow diagram of FIG. 3. When a microservice registers, authentication metadata 136-138 is also registered with the microservice AUTH computing system 102. This authentication metadata describes what a microservice allows in terms of access, anchored on available permissions, access patterns, and other partition information (e.g., allow a different set of permissions in Geolocation1 than is allowed in Geolocation2). The authentication metadata illustratively includes an app ID, uniquely identifying the microservice that registered it. This is indicated by block 182 in the flow diagram of FIG. 3. The microservices can be registered with the microservice AUTH computing system 102 in other ways, and the authentication metadata can include other items as well. This is indicated by block 184.

Also, it is assumed that authorization policy metadata 150-152 (also referred to as an authorization policy) corresponding to each microservice 104-106 is registered with microservice AUTH computing system 102. This is indicated by block 186. In one example, each authorization policy includes a policy identifier 188 that uniquely identifies the policy. The authorization policy also illustratively includes the identity and description of the corresponding microservice. This is indicated by block 190. It includes the context in which it is allowed to authenticate, such as what credentials it must present, which can be partitioned on a per logical or physical partition basis. For instance, the microservice can be allowed to authenticate to a microservice on Geolocation1 but not in Geolocation2. It thus provides additional controls on what targets a microservice can authenticate to. The authorization policy can also include the permissions exposed by the corresponding microservices to other microservices (or requesting entities) that may request access. This is indicated by block 192. It includes the identities of microservices (or other requesting entities) that have permission to access the microservice. This is indicated by block 194. In one example, the identities are the application identifiers that are in the authentication metadata corresponding to the microservice, when it registers with the microservice AUTH computing system 102. The authorization policy also illustratively includes permissions granted for a plurality of different access patterns. This is indicated by block 196. The authorization policies can include additional or different data as well, and this is indicated by block 198.

As an example, a set of authorization policy metadata (e.g., authorization policy 150) can be implemented as a JSON encoded file such as that illustrated in Table 1 below.

then it will not be considered at runtime. The example authorization policy shown in Table 1 also includes an alias for the owners of the policy. The owners can be individuals or groups, such as teams. It includes identifiers of the URL corresponding to the microservice (which in the example shown in Table 1, is an API) and the permissions that are surfaced by the API. It also includes a set of authorization grants for access tokens for a plurality of different types of access patterns.

The access patterns used in the example shown in Table 1, the policy include a set of authorization grants (permissions) for a direct access pattern in which a device application or a web application directly requests an access token from a token issuer and uses this token to authenticate to the microservice (e.g., the API). The authorization policy includes a set of authorization grants for protected forwarded access (using a protected forwarded token—or PFT). This type of access pattern is used when a middle tier service or microservice receives an access token issued to a device or web application and forwards this, along with the API request, to the microservice that is ultimately being accessed. The authorization policy shown in FIG. 1 also includes a set of authorization grants for an access pattern which is implemented for high privileged access (or HPA). This access pattern is used when a service or microservice has no access token, and requests an access token from a token issuer without any proof of an authenticated subject (such as background processing), and further gains access to a broad scope of tenants (even, for example, authorization to impersonate users in the tenants).

Each of the access patterns is now considered in more detail. The direct access pattern has permissions which apply to an access token issued to an application (e.g., a requesting entity) that is either played directly by the application or forwarded. The application is identified by the App ID in the token. This means that permissions listed in the authorization policy for a specific App ID are granted in addition to any other permissions that may already exist in the access token for that App ID. Permissions in the authorization policy may be granted in ways that are distinct between tokens issued to a requesting entity that is a user or to a requesting entity that is an application. In order to grant an application direct permissions, a section is added to the

TABLE 1

```
{
  "Name": "Outlook Rest API",
  "Id": "... some unique guid ...",
  "CreatedTime": "04/12/2018 3:12:20 PM",
  "Enabled": true,
  "Owners": [
    "doe",
    "roe"
  ],
  "ApiUrlSurface": "Api"
  "ApiPermissions": [ OAuthGrants (e.g., Mail.Read, Mail.Write, Calendar.Read, etc.]
  "ClientAccessProtocols": [ ... Authorization Grants for Access Tokens ... ]
  "PFTAccessProtocols": [ .... Authorization Grants for PFT ... ],
  "HighPrivilegedAccessProtocols": [ ... Authorization Grants for HPA S2S ... ],
}
```

It can be seen that the authorization policy includes the name of the corresponding microservice, along with a unique identifier, that uniquely identifies the authorization policy. It includes a time when the authorization policy was created, as well as a Boolean field indicating whether this particular authorization policy is enabled. If it is not enabled, "ClientAccessProtocol" shown in Table 1. The section includes properties for the friendly name of the application, the identity (app ID) of the application, authorized user permissions for delegation tokens, and authorized application permissions for app-only tokens. One example of a client access protocol section is shown in Table 2.

TABLE 2

```
ClientAccessProtocol": [
    {
        "Appid": "d3590ed6-52b3-4102-aeff-aad2292ab01c",
        "Name": "Microsoft Office",
        "AccountTypes": [
                "Consumer Account",
                "Organizational Account"
        ],
        "AuthorizedUserPermissions": [
            Contacts.ReadWrite,Calendars.ReadWrite,Mail.Send,Mail.ReadWrite,Group
            .ReadWrite.All,Files.ReadWrite.All,Tags.ReadWrite,Privilege.ELT,Signals.
            ReadWrite,Signals.Read,Notes.Read,Notes.ReadWrite,SubstrateSearch-
            Internal.ReadWrite,MailboxSettings.ReadWrite,Calendars.ReadWrite.Share
            d,Contacts.ReadWrite.Shared,Mail.ReadWrite.Shared,Mail.Send.Shared,Tas
            ks.ReadWrite.Shared,User-
            Internal.ReadWrite,OutlookService.AccessAsUser.All,Branford-
            Internal.ReadWrite,People.Read,People.ReadWrite
        ],
        "AuthorizedAppPermissions": [ ],
    },
    {
        "Appid": "27922004-5251-4030-b22d-91ecd9a37ea4",
        "Name": "Outlook Mobile",
        "AccountTypes": [
            "OrganizationalAccount"
    ],
        "AuthorizedUserPermissions": [
            Mail.ReadWrite,Mail.Send,Calendars.ReadWrite,Contacts.ReadWrite,Peopl
            e.Read,People.ReadWrite,Directory.ReadWrite.All,Group.ReadWrite.All,Us
            er.Read.All,Calendars.ReadWrite.All,MailboxSettings.ReadWrite,Roaming
            Settings.ReadWrite,Files.ReadWrite,Addins.ReadWrite,EAS.AccessAsUser.
            All,Privilege.ELT,TailoredExperiences-Internal.Read,TailoredExperiences-
            Internal.ReadWrite,BingCortana-Internal.ReadWrite,SubstrateSearch-
            Internal.ReadWrite,OutlookService.AccessAsUser.All,Ews.AccessAsUser.A
            ll,People.Read.All,Signals-Internal.Read,Signals-
            Internal.ReadWrite,Signals.Read,Signals.ReadWrite,User-
            Internal.ReadWrite
        ],
        "AuthorizedAppPermissions": [ ],
    }
]
```

Configuring permissions for an access pattern that is implemented as a protected forward access pattern are permissions that apply to access tokens issued to an application, that are then forwarded by a middle tier service or API. The access grants can include two aspects. One is that they are to accept an access token that was forwarded by a particular service or API, and a second is that they are to assign additional permissions based on the service or API that forwarded the access token and/or the permissions in the forwarded access token.

An example will now be discussed that further illustrates the protected forwarded access pattern. Assume, that a client issues an access token to a service A which submits the token to the ultimate microservice or API. This means that the "front door service" (which is the service to which the token was originally issued) is service A and the "downstream API" is the ultimate API or microservice that receives the token. In another scenario supported by the present example, assume that the client issues the token to a first service B which forwards the token to service A which then sends the token to the ultimate API or microservice. In such a scenario, the "front door service" is service B and the "actor" is still service A, while the "downstream API" is still the ultimate API or microservice that receives the token. Assume also, for the sake of the present example, that the client can also send the token to a service C which forwards it to service A which, again, forwards it to the ultimate API or microservice. In that case, the "front door service" is service C and the "actor" is still service A, while the "downstream API" remains the ultimate API or microservice that receives the token.

In this example, in order for access to be allowed in the downstream API, rules must be granted that reflect that there is an actor A that forwards the token, and there might be different front door services that call through the actor A. A simplified structure to allow the above example may be that shown in Table 3. Information that should be known to configure the access grants for this protocol include the friendly name of the actor, and the app ID of the actor, as well as the friendly name of any front door service, the audiences or sites allowed, and the permissions that are expected in the token.

TABLE 3

```
PFTAccessProtocol: [
    {
        Actor A:
        FrontDoorService [
            {
                Service: A
            }
            {
                Service: B
            }
            {
                Service: C
            }
        ]
    ]
```

High privileged access grants first party access services broad access to the ultimate microservice or API for which access is being requested, including the ability to impersonate any users of the ultimate microservice or API. A high privileged access is manifested in that a first party calling service can use any of a variety of different access protocols.

The properties used to grant an application high privileged access include a friendly name of the calling first party service, the app ID of the calling first party service, and account types, which define the scope of data that the calling first party service is allowed to access. The properties also include an indication as to whether the calling first party service is to use a POP authenticator, a token that indicates whether the first party service is allowed to use a single reusable token to assert its identity, a filter that defines what user impersonated permissions the first party service is allowed to access, and a filter that defines what app-only permissions the first party service is allowed to access. In order to grant high privilege access to a first party service, a section is added to the "HighPrivilegedAccessProtocol" section in the authorization policy illustrated in Table 1. One example of this is shown below in Table 4.

indicated by block 200 in the flow diagram of FIG. 3. The authentication statement generator/token issuer 142 then issues a token based upon the authentication metadata (stored in store 124) corresponding to microservice 104 and/or microservice 106. The token will include the app ID for the requesting microservice 104 and it may also include permissions corresponding to the token. This is indicated by block 202.

Once the requesting microservice 104 receives the token, it makes a call to the receiving microservice 106, including the token, for access. Making a call to the receiving microservice 106, along with the access token, is indicated by block 204 in the flow diagram of FIG. 3.

The authentication server for the receiving microservice 106 (in the example shown in FIG. 1 it is authentication server 128) then validates the access token provided by microservice 104. This is indicated by block 206. Authorization server 130 then identifies any applicable authorization policies 150-152 in authorization store 126. This is indicated

TABLE 4

```
"HighPrivilegedAccessProtocol":
[
  {
    "Name": "SharePoint Online"
    "ActorAppid": "00000003-0000-0ff1-ce00-000000000000",
    "AccountTypes": [ "OrganizationalAccount" ],
    "POPRequired": "false",
    "AllowGlobalActorToken": "false"
    "AcceptedUserPermissions": [
       "Mail.Send", "Group.ReadWrite.All", "SubstrateSearch-Internal.ReadWrite",
       "SharePointNotifications.Send", "Files.Read.All", "Sites.Read.All", "Privilege.Skip
       ClientAccessRules","Privilege.SkipFileSecurityTrimming","IPSubstrate.PolicyEv
       aluationHistory.Read","IPSubstrate.PolicyTip.Read","IPSubstrate.PolicyTipOverr
       ide.ReadWrite","User.Read;User.ReadWrite.All","Directory.Read.Local", "Direct
       ory.Read.Global","FileActivityStats.Read.Shared"
    ],
    "AcceptedAppPermissions": [
       "Mail.Send", "Group.ReadWrite.All", "SharePointNotifications.Send","Files.Read.
       All","Sites.Read.All","Privilege.SkipClientAccessRules","Privilege.SkipSecurity
       Trimming", "IPSubstrate.AzureConnection.Read","User.Read","User.ReadWrite.A
       ll","Directory.Read.Local","Directory.Read.Global","FileActivityStats.Read.Shar
       ed"
    ],
  },
  {
    "Name": "Office Roaming For Business"
    "ActorAppid": "1caee58f-eb14-4a6b-9339-1fe2ddf6692b",
    "AccountType": [ "OrganizationalAccount|ConsumerAccount" ],
    "POPRequired": "true",
    "AllowGlobalActorToken": "yes"
    "AcceptedUserPermissions": [
       "RoamingSettings.Read","RoamingSettings.ReadWrite","Files.ReadWrite.All","P
       rivilege.SkipClientAccessRules","SDS-
       Internal.ReadWrite","DirectoryUser.Create.Global"
    ],
    "AcceptedAppPermissions": [ ],
  }
]
```

Returning to the flow diagram shown in FIG. 3, it is now assumed that the authorization policies 150-152 have been stored in microservice AUTH computing system 102. The present description will proceed with respect to one microservice using an access token to access a second microservice. For purposes of the present example, it will be assumed that microservice 104 is the requesting microservice (or requesting entity) and that microservice 106 is the microservice that receives the call or request and that is being accessed (the receiving microservice).

In accordance with that example, the requesting microservice 104 requests an access token from authentication server 128 to access the receiving microservice 106. This is by block 208. For example, the app ID extractor 162 can extract the app ID from the access token, and the access pattern identifier component 164 can identify the access pattern being used by the requesting microservice 104. Based upon the app ID and the access pattern, applicable authorization policy identifier component 166 can identify an applicable authorization policy, and permission identifier 168 can identify the permissions that are to be assigned to the requesting microservice 104. Identifying the applicable authorization policy based on the app ID is indicated by block 210 in the flow diagram of FIG. 3, and identifying it based on the access pattern used by the requesting microservice 104 is indicated by block 212. The authorization server 130 can identify the applicable authorization policies and permissions in other ways as well, and this is indicated by block 214.

Decision generation component 120 then applies the permissions to the call made by requesting microservice 104 to decide whether the call is authorized (e.g., whether the permissions in the applicable authorization policies include the permissions in the request or call made by microservice 104). This is indicated by block 216 in the flow diagram of FIG. 3.

Decision output component 172 then provides the decision to the receiving microservice 106 indicating whether the decision is to grant access to requesting microservice 104, or to deny it. Outputting the decision to the receiving microservice 106 is indicated by block 218 in the flow diagram of FIG. 3.

In one example, all of the interactions with microservice AUTH computing system 102 can be tracked by interaction processing system 132. Thus, for purposes of the present discussion, it is assumed that interaction processing system 132 is detecting and tracking the interactions among the various microservices and their interactions with microservice AUTH computing system 102. For instance, interaction processing system 132 can include a logging system 220, a risk analysis system 222, and it can include other items 224. Logging system 220 may log the various interactions so that they can be analyzed later. Risk analysis system 222 can be configured to correlate interactions with risk levels. For instance, it may be that for a certain access pattern, the permissions are divided into different risk categories or levels. The greater permissions being granted, the higher risk category. This can be broken out based on access patterns, based upon the audiences permitted to have access, or in other ways.

Therefore, once a call is made from microservice 104 to microservice 106, the call may be submitted to risk analysis system 222 which assigns a risk level associated with that call. Thus, even if authorization decision generator 156 outputs a decision granting the requested access, it may be that risk analysis system 222 also outputs a risk level indicator that indicates the risk level corresponding to the requested access. Thus, the receiving microservice 106 (or an administrative user of the microservice 106 who is notified of the risk level) may override the decision to grant the requested access, and, instead, deny it based upon the risk level associated with the requested access. Therefore, outputting a risk level assessment in addition to the decision by authorization decision generator 156 is indicated by block 226 in the flow diagram of FIG. 3. The decision can include other items, or be output in other ways as well, and this is indicated by block 228.

Logging system 220 also logs the interaction and may log the decision output by authorization decision generator 156. Logging the interactions in this way is indicated by block 230 in the flow diagram of FIG. 3. Risk analysis system 222 may generate the risk assessments by using a risk assessment model. The model may be trained based on interactions and other criteria to classify the various requests for access into different risk levels. In such an example, the interactions that are logged by logging system 220 may be provided to risk analysis system 222 which can add the data representative of the interactions to the risk assessment model. In this way, the model can be trained for improvement with use. This is indicated by block 232 in the flow diagram of FIG. 3.

It can be noted that the access patterns mentioned herein are examples only. They should be extended to include other access patterns as well.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
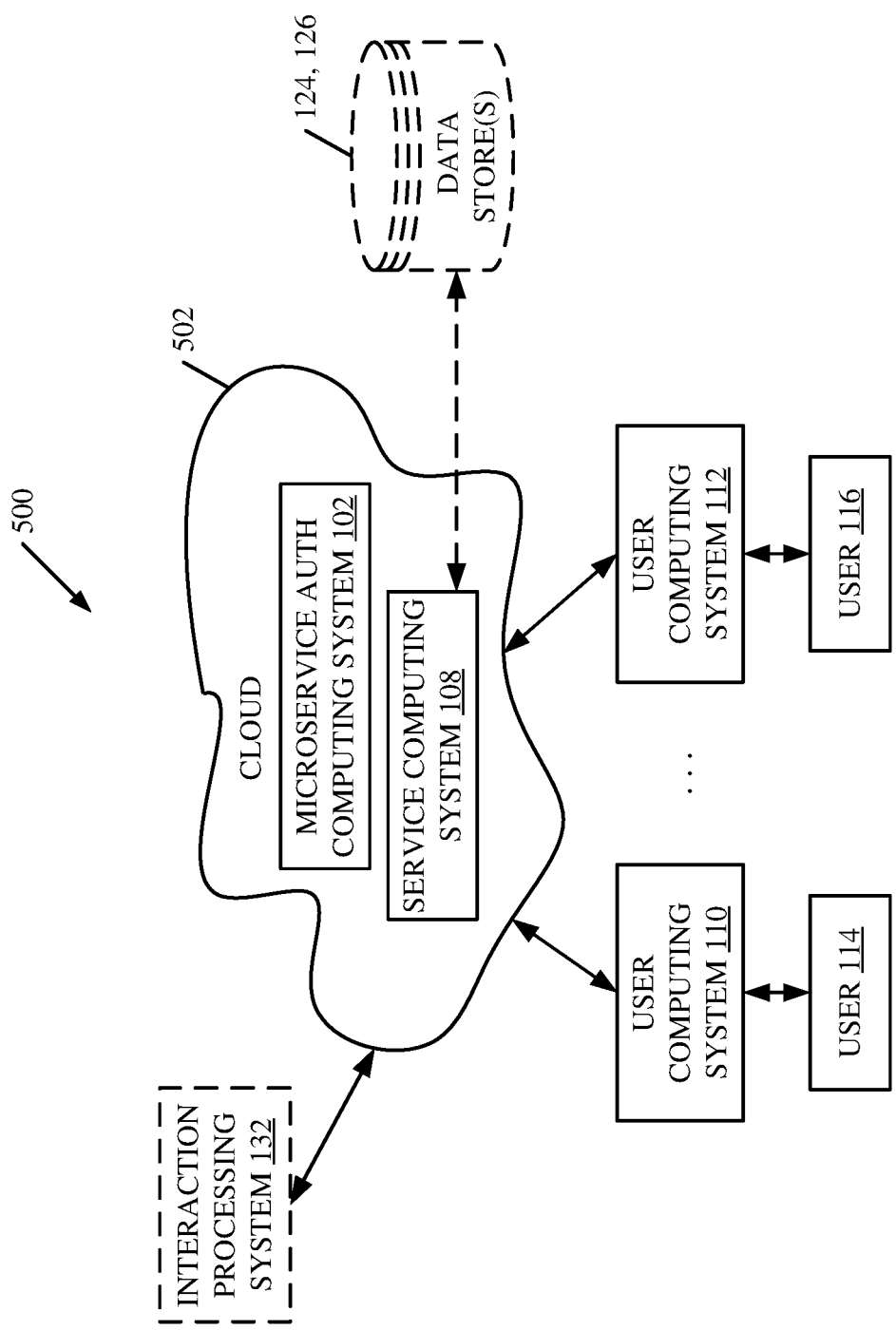
FIG. 4 is a block diagram showing the computing system architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that microservice AUTH computing system 102 and service computing system 108 can be located in cloud 502 (which can be public, private, or a combination where portions are public while others are private). Therefore, users 114-116 use user computing systems 110, 112 (which can be on user devices) to access those systems through cloud 502.

FIG. 4 also depicts another example of a cloud architecture. FIG. 4 shows that it is also contemplated that some elements can be disposed in cloud 502 while others are not. By way of example, data stores 124, 126 can be disposed outside of cloud 502, and accessed through cloud 502. In another example, interaction processing system 132 (or other items) can be outside of cloud 502. Regardless of where they are located, they can be accessed directly by the user devices through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
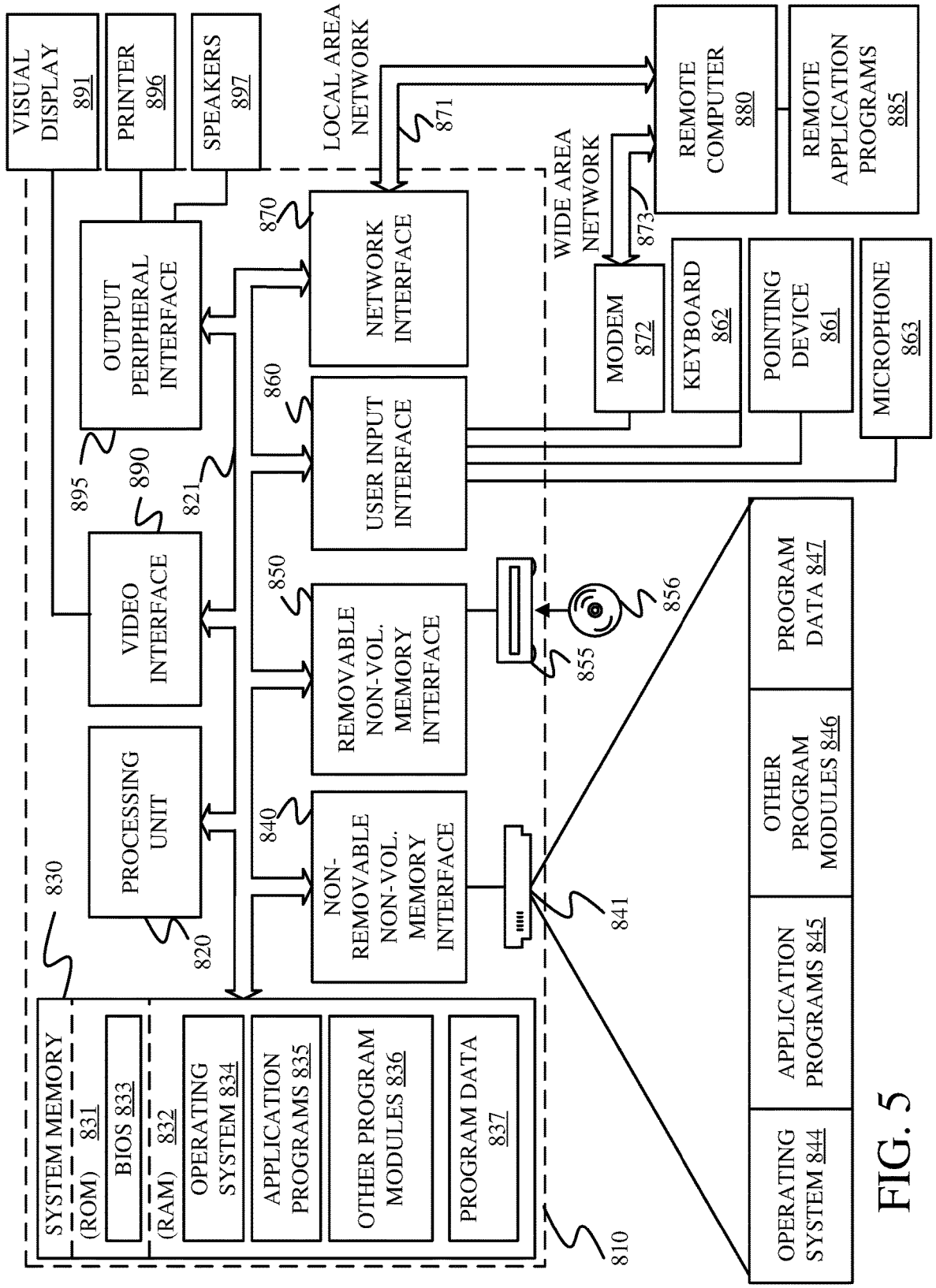
FIG. 5 is a block diagram showing one example of a computing environment that can be used in the architectures shown in the previous figures.

FIG. 5 is one example of a computing environment in which architecture 100, or parts of it, (for example) can be deployed. With reference to FIG. 5, an example system for implementing some embodiments includes a computing device in the form of a computer 810 programmed as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 5 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 5 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:

receiving an access request made to a microservice from a requesting entity, requesting access to the microservice, along with an access token;

obtaining an identity of the requesting entity from the access token;

identifying an access pattern used by the requesting entity to obtain the access token and request access to the microservice;

identifying permissions in an access policy, corresponding to the microservice, based on the identity of the requesting entity and the identified access pattern; and generating an authorization output indicative of an authorization determination with respect to the access request.

Example 2 is the computer implemented method of any or all previous examples and further comprising:

before identifying permissions, validating the access token.

Example 3 is the computer implemented method of any or all previous examples wherein validating the access token comprises:

identifying access permissions corresponding to the access token; and validating that the requested access is included in the access permissions.

Example 4 is the computer implemented method of any or all previous examples wherein generating the authorization determination comprises:

if the permissions identified from the access policy include the requested access, then generating the authorization output authorizing the access request.

Example 5 is the computer implemented method of any or all previous examples wherein generating the authorization determination comprises:

if the permissions identified from the access policy do not include the requested access, then generating the authorization output denying the access request.

Example 6 is the computer implemented method of any or all previous examples and further comprising:

registering authentication metadata for the requesting entity and for the microservice with an authentication server;

receiving, at the authentication server, an access token request from the requesting entity, requesting the access token; and issuing the access token from the authentication server to the requesting entity based on the authentication metadata.

Example 7 is the computer implemented method of any or all previous examples wherein identifying the access pattern comprises:

identifying that the requesting entity to which the access token is issued is an application that directly sent the access token to the microservice; and identifying the access pattern as a direct access pattern, and wherein identifying permissions in the access policy, corresponding to the application, comprises identifying the permissions in the access policy based on the identity of the application and the access pattern being a direct access pattern.

Example 8 is the computer implemented method of any or all previous examples wherein identifying the access pattern comprises:

identifying that the requesting entity to which the access token is issued is an application that sends the access token to an intermediate microservice that forwards the access token to the microservice; and identifying the access pattern as a protected forwarded access pattern, and wherein identifying permissions in the access policy, corresponding to the application, comprises identifying the permissions in the access policy based on the identity of the application and the access pattern being a protected forwarded access pattern.

Example 9 is the computer implemented method of any or all previous examples wherein identifying the access pattern comprises:

identifying that the requesting entity to which the access token is issued is a service or microservice that obtains the access token without providing authentication for a specific set of permissions; and identifying the access pattern as a high privileged access pattern, and wherein identifying permissions in the access policy, corresponding to the application, comprises identifying the permissions in the access policy based on the identity of the service or microservice which comprises the requesting entity and the access pattern being a high privileged access pattern.

Example 10 is the computer implemented method of any or all previous examples and further comprising:

logging interaction information, including the access request, an identity of the microservice, the identity of the requesting entity, an indicator of the access pattern, the permissions, an access policy identifier, and the authorization output indicative of the authorization determination, in an interaction processing system.

Example 11 is the computer implemented method of any or all previous examples and further comprising:

generating a risk assessment model based on the logged interaction information, the risk assessment model being configured to identify a risk assessment level based on interaction information provided to the risk assessment model during a runtime operation.

Example 12 is the computer implemented method of any or all previous examples and further comprising:

generating a runtime risk assessment level with the risk assessment model, corresponding to the interaction information provided to the risk assessment model during the runtime operation; and returning risk assessment model with the authorization determination.

Example 13 is a computer system, comprising:

one or more processors; and memory storing instructions which, when executed by the one or more processors causes the one or more processors to perform steps comprising:

receiving an access request made to a microservice from a requesting entity, requesting access to the microservice, along with an access token;

obtaining an identity of the requesting entity from the access token;

identifying an access pattern used by the requesting entity to obtain the access token and request access to the microservice;

identifying permissions in an access policy, corresponding to the microservice, based on the identity of the requesting entity and the identified access pattern; and generating an authorization output indicative of an authorization determination with respect to the access request.

Example 14 is the computer system of any or all previous examples wherein the instructions cause the one or more processors to perform steps further comprising:

before identifying permissions, validating the access token.

Example 15 is the computer system of any or all previous examples wherein validating the access token comprises:

identifying access permissions corresponding to the access token; and validating that the requested access is included in the access permissions.

Example 16 is the computer system of any or all previous examples wherein generating the authorization determination comprises:

if the permissions identified from the access policy include the requested access, then generating the authorization output authorizing the access request; and if the permissions identified from the access policy do not include the requested access, then generating the authorization output denying the access request.

Example 17 is the computer system of any or all previous examples wherein identifying the access pattern comprises:

identifying that the requesting entity to which the access token is issued is an application that directly sent the access token to the microservice; and identifying the access pattern as a direct access pattern, and wherein identifying permissions in the access policy, corresponding to the application, comprises identifying the permissions in the access policy based on the identity of the application and the access pattern being a direct access pattern.

Example 18 is the computer system of any or all previous examples wherein identifying the access pattern comprises:

identifying that the requesting entity to which the access token is issued is an application that sends the access token to an intermediate microservice that forwards the access token to the microservice; and identifying the access pattern as a protected forwarded access pattern, and wherein identifying permissions in the access policy, corresponding to the application, comprises identifying the permissions in the access policy based on the identity of the application and the access pattern being a protected forwarded access pattern.

Example 19 is the computer system of any or all previous examples wherein identifying the access pattern comprises:

identifying that the requesting entity to which the access token is issued is a service or microservice that obtains the access token without providing authentication for a specific set of permissions; and identifying the access pattern as a high privileged access pattern, and wherein identifying permissions in the access policy, corresponding to the application, comprises identifying the permissions in the access policy based on the identity of the service or microservice which comprises the requesting entity and the access pattern being a high privileged access pattern.

Example 20 is a computer system, comprising:

one or more processors; and memory storing instructions which, when executed by the one or more processors causes the one or more processors to perform steps comprising:

receiving an access request made to a microservice from a requesting entity, requesting access to the microservice, along with an access token;

obtaining an identity of the requesting entity from the access token;

identifying an access pattern used by the requesting entity to obtain the access token and request access to the microservice;

identifying permissions in an access policy, corresponding to the microservice, based on the identity of the requesting entity and the identified access pattern;

generating an authorization output indicative of an authorization determination with respect to the access request;

logging interaction information, including the access request, an identity of the microservice, the identity of the requesting entity, an indicator of the access pattern, the permissions, an access policy identifier, and the authorization output indicative of the authorization determination, in an interaction processing system;

generating a risk assessment model based on the logged interaction information, the risk assessment model being configured to identify a risk assessment level based on interaction information provided to the risk assessment model during a runtime operation;

generating a runtime risk assessment level with the risk assessment model, corresponding to the interaction information provided to the risk assessment model during the runtime operation; and returning risk assessment model with the authorization determination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
  receiving an access request made to a microservice from a requesting entity, requesting access to the microservice, along with an access token;
  obtaining an identity of the requesting entity from the access token;
  identifying an access pattern used by the requesting entity, the access pattern representing computing actions performed to obtain the access token and request access to the microservice;
  identifying permissions in an access policy, corresponding to the microservice, based on:
    the identity of the requesting entity, and
    the access pattern; and
  generating, based on the permissions, an authorization output indicative of an authorization determination with respect to the access request.

2. The computer implemented method of claim 1 wherein the permissions in the access policy comprise;
  a first permission corresponding a first access pattern, wherein the first permission defines authorization of access requests when the first access pattern is used to obtain an access token; and
  a second permission corresponding a second access pattern different than the first access pattern, wherein the second permission defines authorization of access requests when the second access pattern is used to obtain an access token.

3. The computer implemented method of claim 1, and further comprising:
  before identifying the permissions, validating the access token comprising:
    identifying access permissions corresponding to the access token; and
    validating that the requested access is included in the access permissions.

4. The computer implemented method of claim 1 wherein generating the authorization output comprises:
  if the permissions identified from the access policy include the requested access, then generating the authorization output authorizing the access request.

5. The computer implemented method of claim 1 wherein generating the authorization output comprises:
  if the permissions identified from the access policy do not include the requested access, then generating the authorization output denying the access request.

6. The computer implemented method of claim 1 and further comprising:
  registering authentication metadata for the requesting entity and for the microservice with an authentication server;
  receiving, at the authentication server, an access token request from the requesting entity, requesting the access token; and
  issuing the access token from the authentication server to the requesting entity based on the authentication metadata.

7. The computer implemented method of claim 1 wherein identifying the access pattern comprises:
  based on identifying that the requesting entity to which the access token is issued is an application that directly sent the access token to the microservice, identifying the access pattern as a direct access pattern, and
  identifying permissions in the access policy, corresponding to the application, comprises:
    identifying the permissions in the access policy based on the identity of the application and the access pattern being a direct access pattern.

8. The computer implemented method of claim 1 wherein identifying the access pattern comprises:
  based on identifying that the requesting entity to which the access token is issued is an application that sends the access token to an intermediate microservice that forwards the access token to the microservice, identifying the access pattern as a protected forwarded access pattern, and
  identifying permissions in the access policy, corresponding to the application, comprises:
    identifying the permissions in the access policy based on the identity of the application and the access pattern being a protected forwarded access pattern.

9. The computer implemented method of claim 1 wherein identifying the access pattern comprises:
  based on identifying that the requesting entity to which the access token is issued is a service or microservice that obtains the access token without providing authentication for a specific set of permissions, identifying the access pattern as a high privileged access pattern, and
  identifying permissions in the access policy, corresponding to the application, comprises:
    identifying the permissions in the access policy based on the identity of the service or microservice which comprises the requesting entity and the access pattern being a high privileged access pattern.

10. The computer implemented method of claim 1 and further comprising:
  logging interaction information, including the access request, an identity of the microservice, the identity of the requesting entity, an indicator of the access pattern, the permissions, an access policy identifier, and the authorization output indicative of the authorization determination, in an interaction processing system.

11. The computer implemented method of claim 10 and further comprising:
generating a risk assessment model based on the logged interaction information, the risk assessment model being configured to identify a risk assessment level based on interaction information provided to the risk assessment model during a runtime operation;
generating a runtime risk assessment level with the risk assessment model, corresponding to the interaction information provided to the risk assessment model during the runtime operation; and
returning risk assessment model with the authorization determination.

12. The computer implemented method of claim 1, wherein the computing actions performed to obtain the access token comprise computing actions performed prior to receiving the access request.

13. A computer system, comprising:
one or more processors; and
memory storing instructions which, when executed by the one or more processors causes the one or more processors to perform steps comprising:
receiving an access request made to a microservice from a requesting entity, requesting access to the microservice, along with an access token;
obtaining an identity of the requesting entity from the access token;
identifying an access pattern used by the requesting entity to obtain the access token and request access to the microservice;
identifying permissions in an access policy, corresponding to the microservice, based on the identity of the requesting entity and the access pattern; and
generating an authorization output indicative of an authorization determination with respect to the access request.

14. The computer system of claim 13 wherein the instructions cause the one or more processors to perform steps further comprising:
before identifying permissions, validating the access token.

15. The computer system of claim 14 wherein validating the access token comprises:
identifying access permissions corresponding to the access token; and
validating that the requested access is included in the access permissions.

16. The computer system of claim 13 wherein generating the authorization output comprises;
if the permissions identified from the access policy include the requested access, then generating the authorization output authorizing the access request; and
if the permissions identified from the access policy do not include the requested access, then generating the authorization output denying the access request.

17. The computer system of claim 13 wherein identifying the access pattern comprises:
identifying that the requesting entity to which the access token is issued is an application that directly sent the access token to the microservice; and
identifying the access pattern as a direct access pattern, and wherein identifying permissions in the access policy, corresponding to the application, comprises identifying the permissions in the access policy based on the identity of the application and the access pattern being a direct access pattern.

18. The computer system of claim 13 wherein identifying the access pattern comprises:
identifying that the requesting entity to which the access token is issued is an application that sends the access token to an intermediate microservice that forwards the access token to the microservice; and
identifying the access pattern as a protected forwarded access pattern, and wherein identifying permissions in the access policy, corresponding to the application, comprises identifying the permissions in the access policy based on the identity of the application and the access pattern being a protected forwarded access pattern.

19. The computer system of claim 13 wherein identifying the access pattern comprises:
identifying that the requesting entity to which the access token is issued is a service or microservice that obtains the access token without providing authentication for a specific set of permissions; and
identifying the access pattern as a high privileged access pattern, and wherein identifying permissions in the access policy, corresponding to the application, comprises identifying the permissions in the access policy based on the identity of the service or microservice which comprises the requesting entity and the access pattern being a high privileged access pattern.

20. A computing system, comprising:
one or more hardware processors; and
memory storing instructions which, when executed by the one or more hardware processors, cause the computing system to:
provide a metadata management computing system;
serve, by an authentication server disposed in the metadata management computing system, a plurality of different sets of authentication metadata to a plurality of different microservices, each set of authentication metadata corresponding to a different microservice and identifying a context in which the corresponding microservice is permitted to authenticate, partitioned based on logical or physical partitions; and
serve, by an authorization server disposed in the metadata management computing system, a plurality of different sets of authorization policy metadata to a plurality of different microservices, each set of authorization policy metadata corresponding to a different microservice and identifying access permitted by the corresponding microservice by identifying permitted access in terms of permissions and access patterns and being partitioned based on logical or physical partitions.

* * * * *